(12) United States Patent
Shibuya

(10) Patent No.: US 9,346,393 B2
(45) Date of Patent: May 24, 2016

(54) SADDLE-RIDE VEHICLE BLINKER DEVICE

(71) Applicant: HONDA MOTOR CO., LTD., Tokyo (JP)

(72) Inventor: Hideyuki Shibuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 324 days.

(21) Appl. No.: 13/958,608

(22) Filed: Aug. 5, 2013

(65) Prior Publication Data

US 2014/0092611 A1    Apr. 3, 2014

(30) Foreign Application Priority Data

Sep. 28, 2012  (JP) ................................. 2012-216979

(51) Int. Cl.
| *B60Q 1/00* | (2006.01) |
| *B62J 6/00* | (2006.01) |
| *B62J 23/00* | (2006.01) |
| *B60Q 1/36* | (2006.01) |
| *B62J 6/18* | (2006.01) |

(52) U.S. Cl.
CPC .............. *B60Q 1/0005* (2013.01); *B60Q 1/36* (2013.01); *B62J 6/005* (2013.01); *B62J 23/00* (2013.01); *B62J 6/18* (2013.01); *B62J 2300/0046* (2013.01)

(58) Field of Classification Search
CPC ........ B60Q 1/0005; B60Q 1/007; B60Q 1/34; B60Q 1/36; B62J 2099/0046; F21S 48/1109; F21S 48/212; F21S 48/31; F21S 48/33; F16L 5/02
USPC .......... 362/362, 473, 546, 548, 549; 439/131, 439/135–150, 86–91
See application file for complete search history.

(56) References Cited

U.S. PATENT DOCUMENTS

| 5,820,254 A * | 10/1998 | Duenas ................... B60Q 1/26 362/473 |
| 6,051,794 A * | 4/2000 | Katou ................. B60R 16/0222 174/151 |
| 6,089,738 A * | 7/2000 | Ebara ................... B60Q 1/0088 362/253 |

(Continued)

FOREIGN PATENT DOCUMENTS

| EP | 2080695 | 7/2009 |
| EP | 2431266 | 3/2012 |

(Continued)

OTHER PUBLICATIONS

Extended European Search Report for corresponding EP Application No. 13178378.9-1760, Dec. 11, 2013.

*Primary Examiner* — Evan Dzierzynski
*Assistant Examiner* — Zheng Song
(74) *Attorney, Agent, or Firm* — Mori & Ward, LLP

(57) ABSTRACT

A saddle-ride vehicle blinker device includes an elastic support member elastically supports the blinker main body at a blinker support part provided on a vehicle body. An electric wire outlet port is disposed at or in a vicinity of the elastic support member. The electric wire is drawn from the electric wire outlet port. A water avoiding part is to cover the electric wire outlet port. A hinge part couples the water avoiding part and the elastic support member both of which are molded integrally with the hinge part. The water avoiding part includes an engagement part which is configured to engage with at least one of a part of the blinker main body, the electric wire, and the blinker support part to maintain the water avoiding part in a position to cover the electric wire outlet port while the hinge part is bent.

7 Claims, 8 Drawing Sheets

(56) References Cited

U.S. PATENT DOCUMENTS

2012/0069590 A1* 3/2012 Nishijima ............... B62J 6/005
362/473

FOREIGN PATENT DOCUMENTS

| JP | 61-64044 | 4/1986 |
|----|----------|--------|
| JP | 2012-062014 | 3/2012 |

* cited by examiner

SADDLE-RIDE VEHICLE BLINKER DEVICE

CROSS-REFERENCE TO RELATED APPLICATIONS

The present application claims priority under 35 U.S.C. §119 to Japanese Patent Application No. 2012-216979, filed Sep. 28, 2012. The contents of this application are incorporated herein by reference in their entirety.

BACKGROUND OF THE INVENTION

1. Field of the Invention

The present invention relates to a saddle-ride vehicle blinker device.

2. Discussion of the Background

Included in a saddle-ride vehicle blinker device may be, for example, as described in JP-A No. 2012-62014, a structure such that a blinker main body is supported at a body and an electric wire drawn from the blinker device is inserted through an insertion hole provided in a side of a body for the purpose of the aforementioned support.

SUMMARY OF THE INVENTION

According to one aspect of the present invention, a saddle-ride vehicle blinker device includes a blinker main body containing a bulb. An elastic support member elastically supports the blinker main body at a blinker support part provided on a vehicle body. Power is supplied to the bulb via an electric wire. An electric wire outlet port is disposed at or in a vicinity of the elastic support member. The electric wire is drawn from the electric wire outlet port. A water avoiding part is to cover the electric wire outlet port. A hinge part couples the water avoiding part and the elastic support member both of which are molded integrally with the hinge part. The water avoiding part includes an engagement part which is configured to engage with at least one of a part of the blinker main body, the electric wire, and the blinker support part to maintain the water avoiding part in a position to cover the electric wire outlet port while the hinge part is bent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
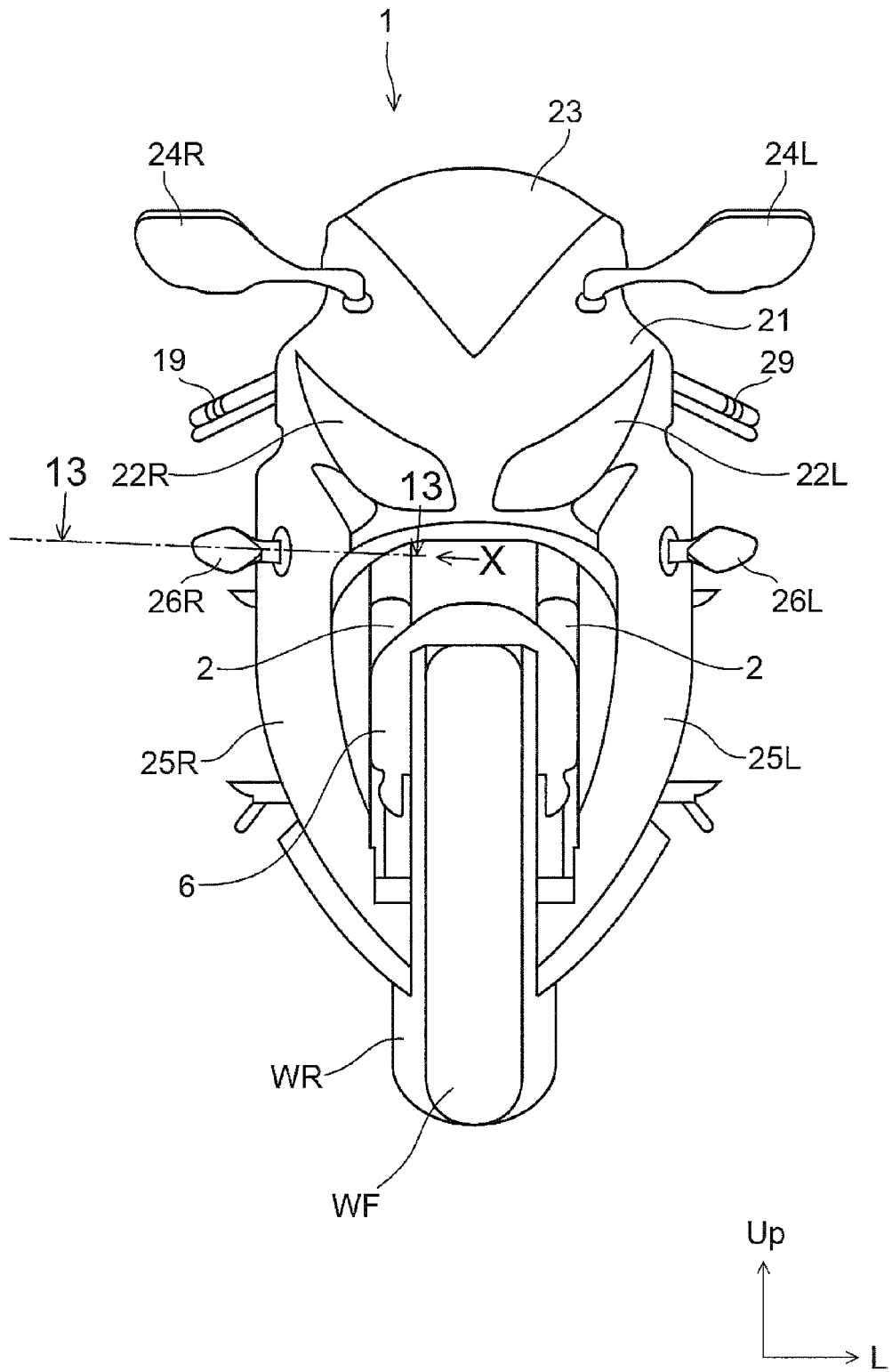
FIG. 1 is an elevation diagram of a motorcycle including a blinker device according to an embodiment of the present invention.

The embodiments will now be described with reference to the accompanying drawings, wherein like reference numerals designate corresponding or identical elements throughout the various drawings.

Figure 2:
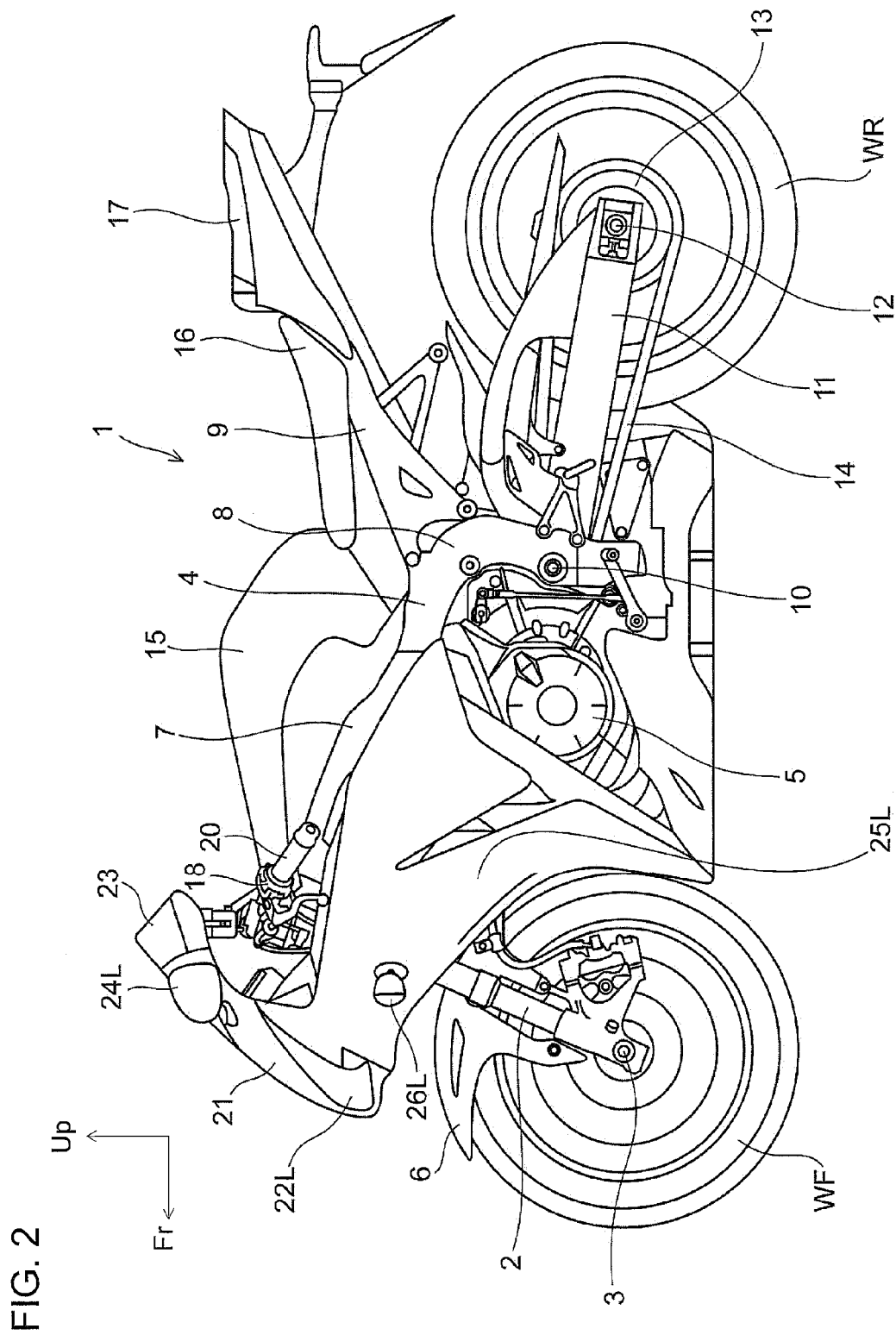
FIG. 2 is a left side diagram of the motorcycle including the blinker device according to the embodiment of the present invention.

Hereinafter, an embodiment of the present invention will be described with reference to the drawings. FIG. 1 is an elevation diagram of a motorcycle as a saddle-ride vehicle including a blinker device according to the embodiment of the present invention, and FIG. 2 is a left side diagram of the same. In the drawings referred to below, a forward direction of the motorcycle is indicated by a reference sign Fr, an upward direction of the same is indicated by a reference sign Up, and left and right sides of the vehicle are indicated by reference signs L and R, respectively. Moreover, members in this embodiment indicated by the same reference signs are the same or equivalent members.

In FIGS. 1 and 2, a motorcycle 1 includes, at lower end parts of front forks 2, a front wheel WF supported with a front wheel shaft 3, and at a mainframe 4 of the body extending rearwardly from a head pipe (not shown) supporting the front forks 2, an engine 5 is suspended. A top part of the front wheel WF is covered by a front fender 6.

The mainframe 4 is composed of: a front part 7 having a front end connected to the head pipe; and a rear part 8 bent from the front part 7 and extending almost perpendicularly. Coupled to a bending part of the mainframe 4 is a seat frame 9 extending to the rear of the body. Provided at the rear part 8 of the mainframe 4 is a pivot shaft 10 extending in a vehicle width direction, and by this pivot shaft 10, a swing arm 11 is supported in a manner such as to be capable of swingably vertically. The swing arm 11 is pivoted by the pivot shaft 10 and also has a middle part in a longitudinal direction coupled to the seat frame 9 (or a rear frame, not shown, coupling together the seat frame and the rear part 8 of the mainframe 4) via a rear cushion and a link mechanism coupled to the rear cushion, both not shown.

At a rear end part of the swing arm 11, a rear wheel WR is supported with a rear wheel shaft 12, and between a driven sprocket 13 linked to the rear wheel WR and a drive sprocket, not shown, provided at an output shaft of the engine 5, a driving chain 14 is stretched over. At the front part 7 of the mainframe 4, a fuel tank 15 is loaded, and on the seat frame 9, a rider seat 16 and a passenger seat 17 are loaded.

Provided at a top part of the front fork 2 is a steering handlebar 18, which has an accelerator grip 19 and a brake grip 20 provided at a right end and a left end, respectively. A body frame of the motorcycle 1 is covered by a cowl or a cover. A front cowl 21 is provided with a pair of left and right head lamps 22L and 22R, and also at a central top part in the vehicle width direction, a windshield 23 is provided which extends in a range over a central top part of the steering handlebar 18. Further, at a top part of the front cowl 21, left and right side mirrors 24L and 24R are respectively provided at positions sandwiching the windshield 23 from the left and the right.

Side cowls 25L and 25R are provided which extend from the front cowl 21 to both left and right sides at a body front part. The side cowls 25L and 25R are, as described later with reference to FIG. 13, composed of an inner side cowl and an outer side cowl. Then left and right blinker devices 26L and 26R are provided which are attached to the inner side cowls and which face outside from the outer side cowls.

Figure 3:
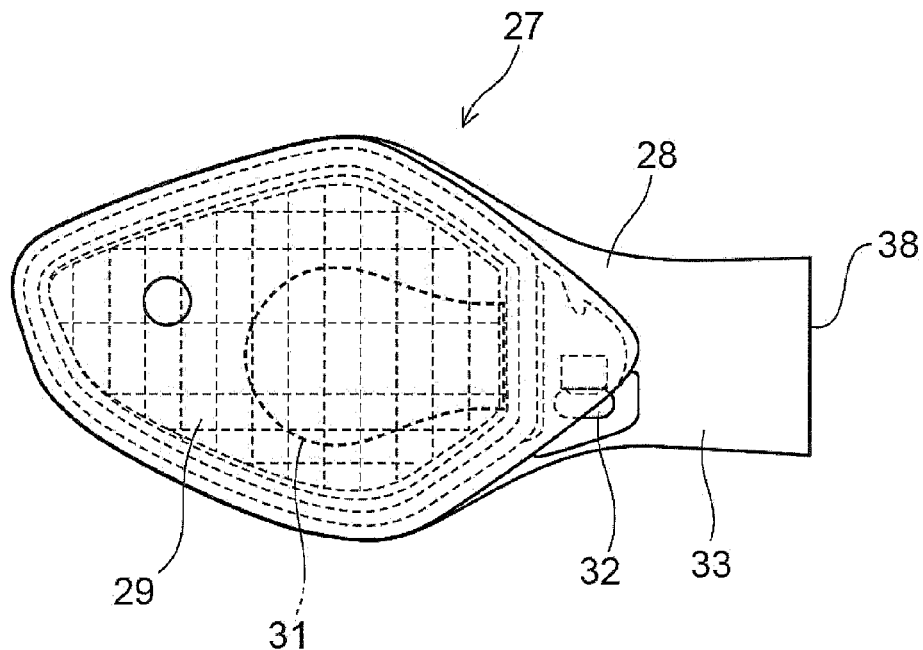
FIG. 3 is an elevation diagram of a blinker main body attached to a right side of a body.

Next, a structure of attaching the blinker devices 26L and 26R will be described, focusing on the blinker device 26L on the right side of the body. Note that the blinker device 26R on the left side is configured in the same manner. FIG. 3 is an elevation view of a blinker main body attached to the right side of the body, and FIG. 4 is a side view of the same (diagram viewed from the body side when fitted to the body).

Figure 4:
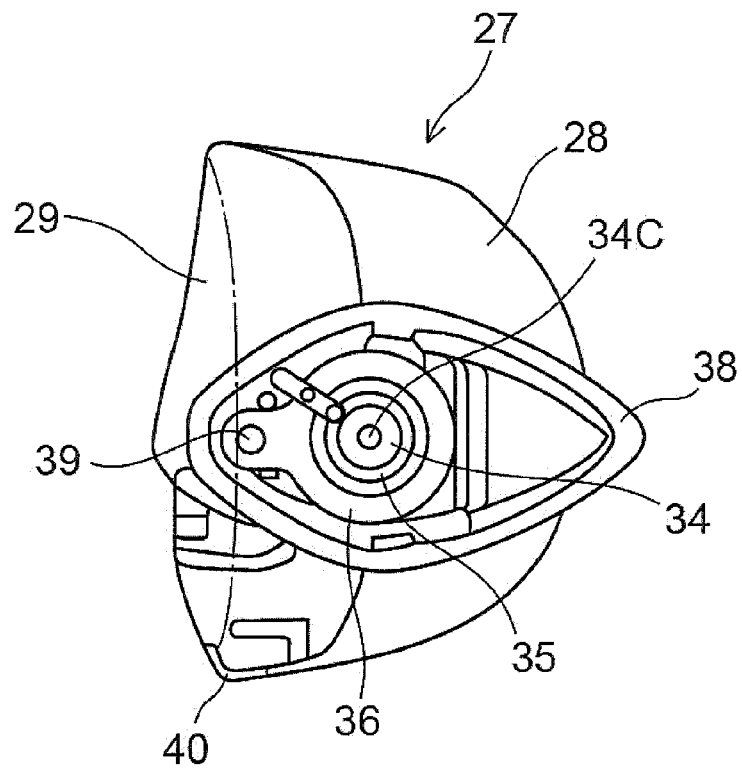
FIG. 4 is a side diagram of the blinker main body (diagram viewed from a body side when it is fitted to the body).
Figure 13:
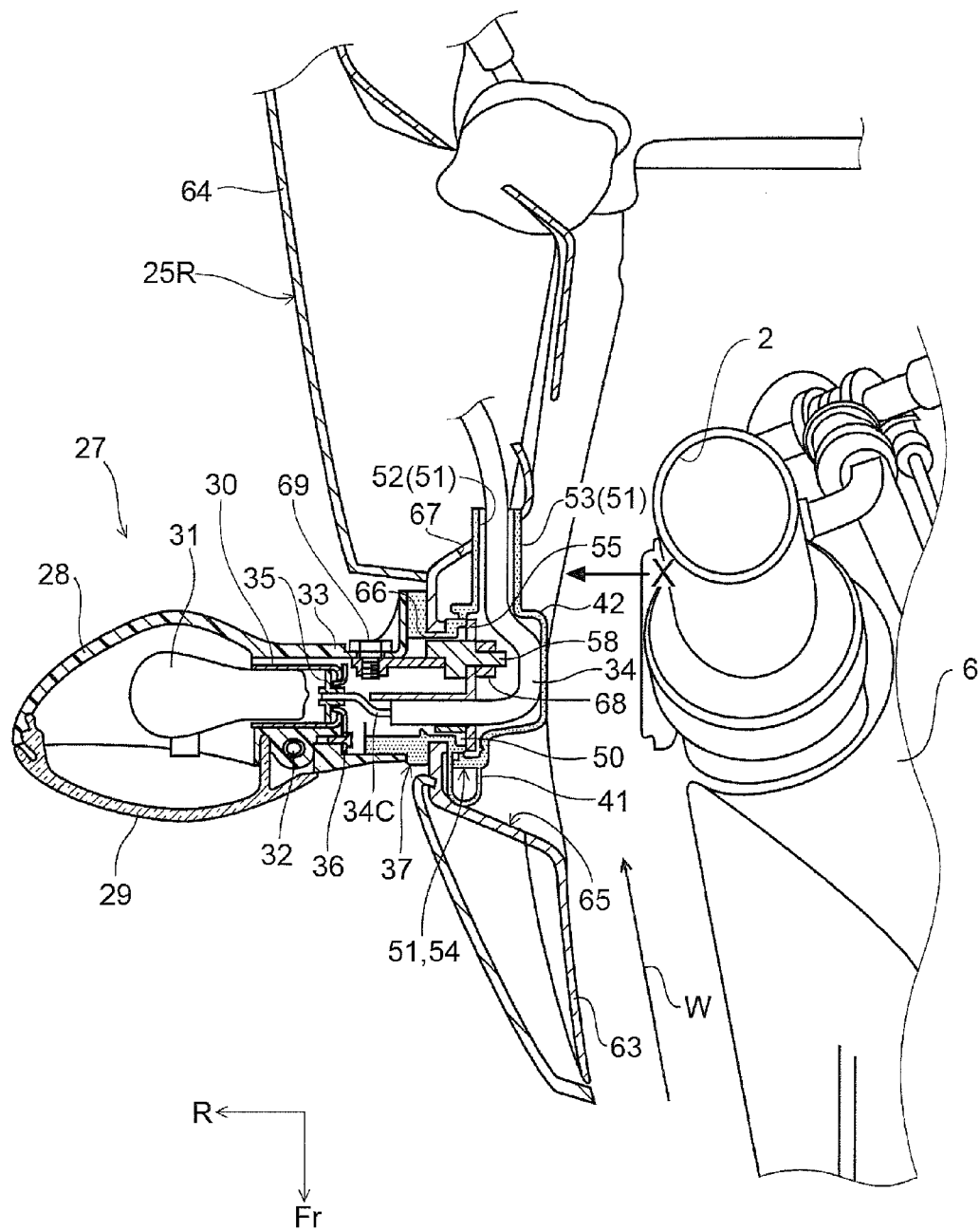
FIG. 13 is a sectional diagram taken along line 13-13 of FIG. 1 and showing how the blinker main body is attached to a body cover.

In FIGS. 3 and 4, the blinker main body 27 includes: a base 28 having a reflection surface on an inner surface thereof; a lens 29 fitted into a front part (body front side) of the base 28; and a bulb 31 stored in a space surrounded by the base 28 and the lens 29 and supported by a socket 30 (see FIG. 13). The lens 29 is fitted to the base 28 and they are fastened to each other with a locking screw 32. The base 28 has a stem part 33 of a cylindrical shape extending to the side of the body. Inserted in a hollow portion of the stem part 33 of the cylindrical shape (see FIG. 13), and linked to the socket 30 are: a plus terminal 35 and a ground terminal 36 linked with core material (a core) 34C of an electric wire 34. An end surface of the stem part 33 forms a seat surface 38 facing a body cover (inner side cowl) with an elastic support member 37 to be described below in between. A shape of the stem part 33 viewed from the side of the body is of a streamline shape that is narrow in width in the longitudinal direction of the body as shown in FIG. 4 and also that is wide in width at a middle portion. The ground terminal 36 is linked to the base 28 by a locking screw 39. In a case where water drops enters into a space surrounded by the lens 29 and the base 28, a drain 40 for draining the water drops to outside is formed on a bottom surface of the lens 29.

Figure 5:
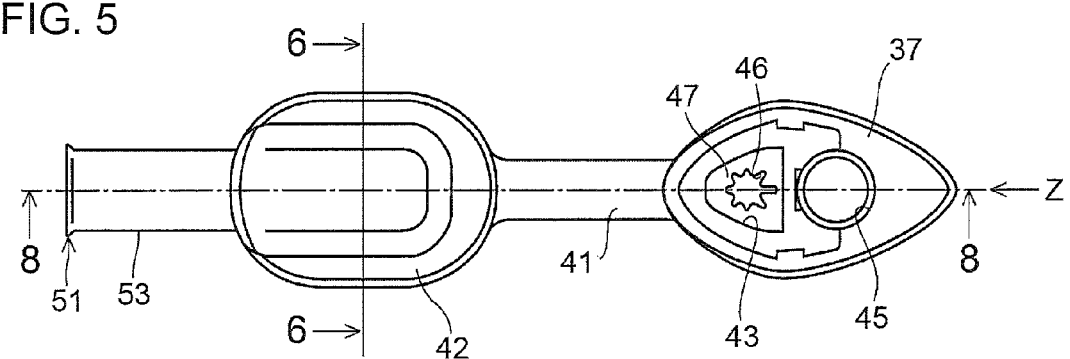
FIG. 5 is an elevation diagram before an elastic support member is attached to the body.
Figure 6:
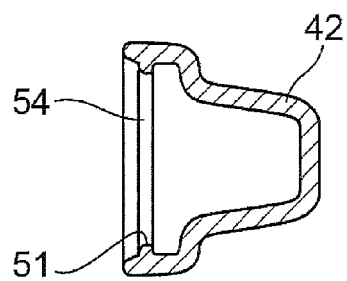
FIG. 6 is a sectional diagram taken along line 6-6 of FIG. 5.
Figure 7:
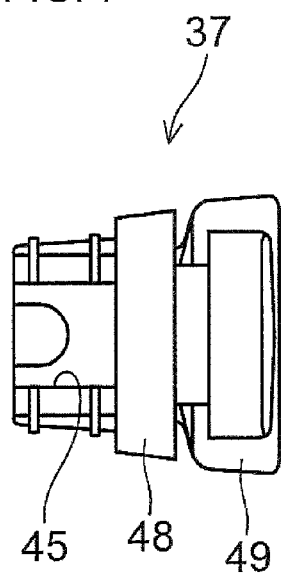
FIG. 7 is a diagram when viewed from arrow Z in FIG. 5.
Figure 8:
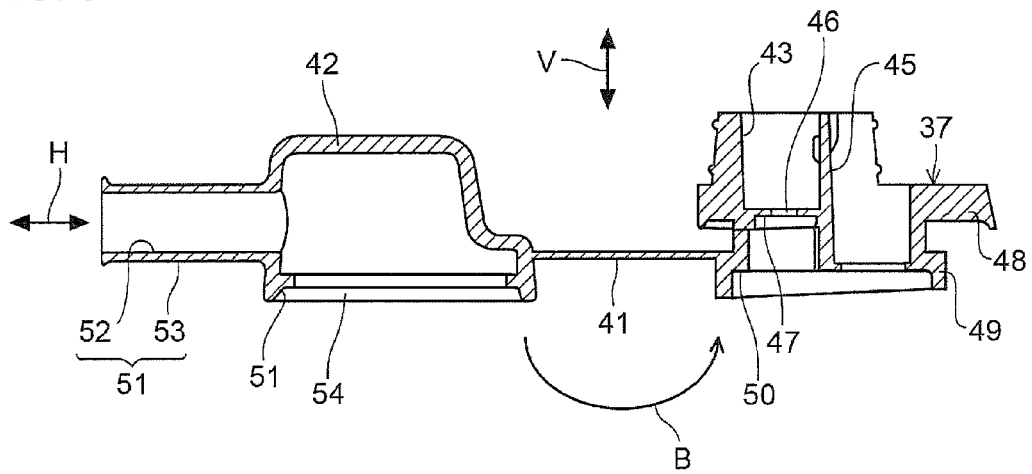
FIG. 8 is a sectional diagram taken along line 8-8 of FIG. 5.

Next, the elastic support member used for elastically fitting the blinker main body to the body cover (here, side cowl) will be described. FIG. 5 is an elevation view of the elastic support member, FIG. 6 is a sectional view taken along line 6-6 of FIG. 5, FIG. 7 is a right side view of FIG. 5, and FIG. 8 is a sectional view taken along line 8-8 of FIG. 5. In FIGS. 5 to 8, the elastic support member 37 is formed of an elastic body (for example, rubber), and is interposed between the stem part 33 of the blinker main body 27 and the side cowl 25R when fitted to the body. To the elastic support member 37, a water avoiding part 42 is coupled with a hinge part 41 in between. The elastic support member 37, the water avoiding part 42, and the hinge part 41 are integrally molded components. The hinge part 41, as is clear from FIG. 8, is formed in a thickness extremely reduced in comparison with the elastic support member 37 and the water avoiding part 42, and is freely bendable in a direction of arrow B in a range of at least 180 degrees.

The elastic support member 37 has: an electric wire through hole 43 for guiding the electric wire 34 drawn from the blinker main body 27 towards the side cowl 25R; and a stay through hole 45 for inserting a stay 44 (to be described below referring to FIGS. 9 and 10) for supporting the blinker main body 27 to the side cowl 25R. Provided at a middle part of the electric wire through hole 43 is a film part 47 including a hole 46 which is formed radially in a manner such as to permit elastic holding of the electric wire 34 and which has a plurality of notches. The elastic support member 37 has: a flange portion 48 interposed between the side cowl 25R and the blinker main body 27 when fitted to the body; and a coupling portion 49 with which the water avoiding part 42 engages when fitted to the body. The flange portion 48 has an outline in an elevation view formed almost in agreement with an outline of the seat surface 38 of the blinker main body 27.

The water avoiding part 42 has: an engagement part 51 that faces the coupling portion 49 of the elastic support member 37 to cover an end part (electric wire outlet port) 50 of the electric wire through hole 43 and the stay through hole 45 while fitted to the side cowl 25R as a body cover by bending the hinge part 41 in the direction of arrow B through 180 degrees; and a tube 53 having an electric wire insertion hole 52 permitting insertion of the electric wire 34 that passes through the electric wire outlet port 50, that is drawn out from the blinker main body 27, and that is bent through approximately 90 degrees while fitted to the body. The engagement part 51 of the water avoiding part 42 includes on an inner circumferential surface a rib 54 locked to surroundings of the coupling portion 49 when the water avoiding part 42 is over the coupling portion 49 of the elastic support member 37.

In the mold formation, as shown in FIG. 8, for directions indicated by arrows V and H, a die cutting direction is set. The arrow V indicates an overall die cutting direction, and the arrow H indicates a slide-type die cutting direction for forming the electric wire insertion hole 52 in the tube 53.

Figure 9:
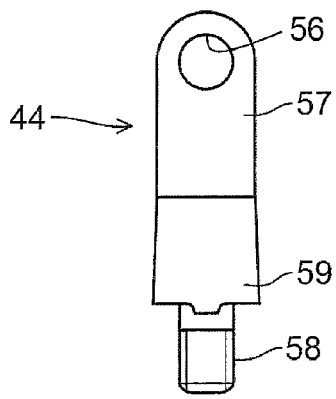
FIG. 9 is an elevation diagram of a stay for coupling together a side cowl and a base of the blinker main body to support the blinker main body to the side cowl.
Figure 10:
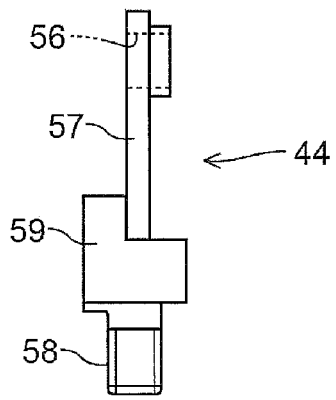
FIG. 10 is a side diagram of the stay.

FIG. 9 is an elevation view of the stay 44 for coupling together the side cowl 25R and the base 28 of the blinker main body 27 to support the blinker main body 27 by the side cowl 25R, and FIG. 10 is a side view of the same. Moreover, FIG. 11 is an elevation view of a stay holding plate 55 coupled to the stay 44, and FIG. 12 is a side view of the stay holding plate 55.

In FIGS. 9 and 10, the stay 44 is composed of: a flat plate part 57 including a screw hole 56 through which a locking screw (to be described below) screwed into the base 28 of the blinker main body 27 from outer circumference is inserted; and a base part 59 including a bolt 58, and it is preferable that the flat plate part 57 and the base part 59 be integrated with each other through welding.

Figure 11:
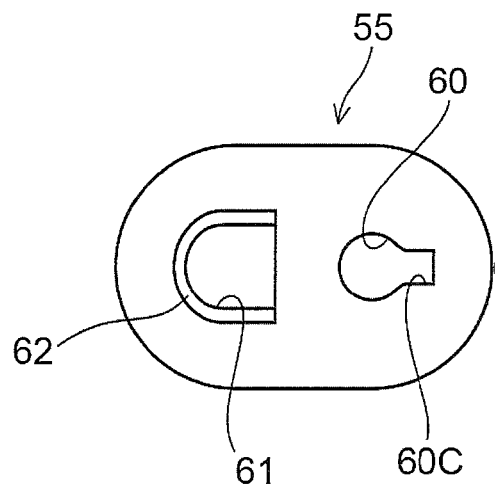
FIG. 11 is an elevation diagram of a stay holding plate coupled to the stay.
Figure 12:
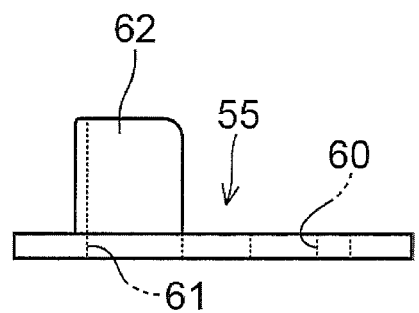
FIG. 12 is a side diagram of the stay holding plate.

Moreover, in FIGS. 11 and 12, the stay holding plate 55 includes: a bolt hole 60 through which the bolt 58 of the stay 44 can penetrate; a hole 61 through which the electric wire 34 can be inserted; and a collar 62 which is provided in an upright posture on an extension of the hole 61 and which can guide the electric wire 34. The bolt hole 60 has a notch 60C extending oppositely to the collar 62.

Figure 14:
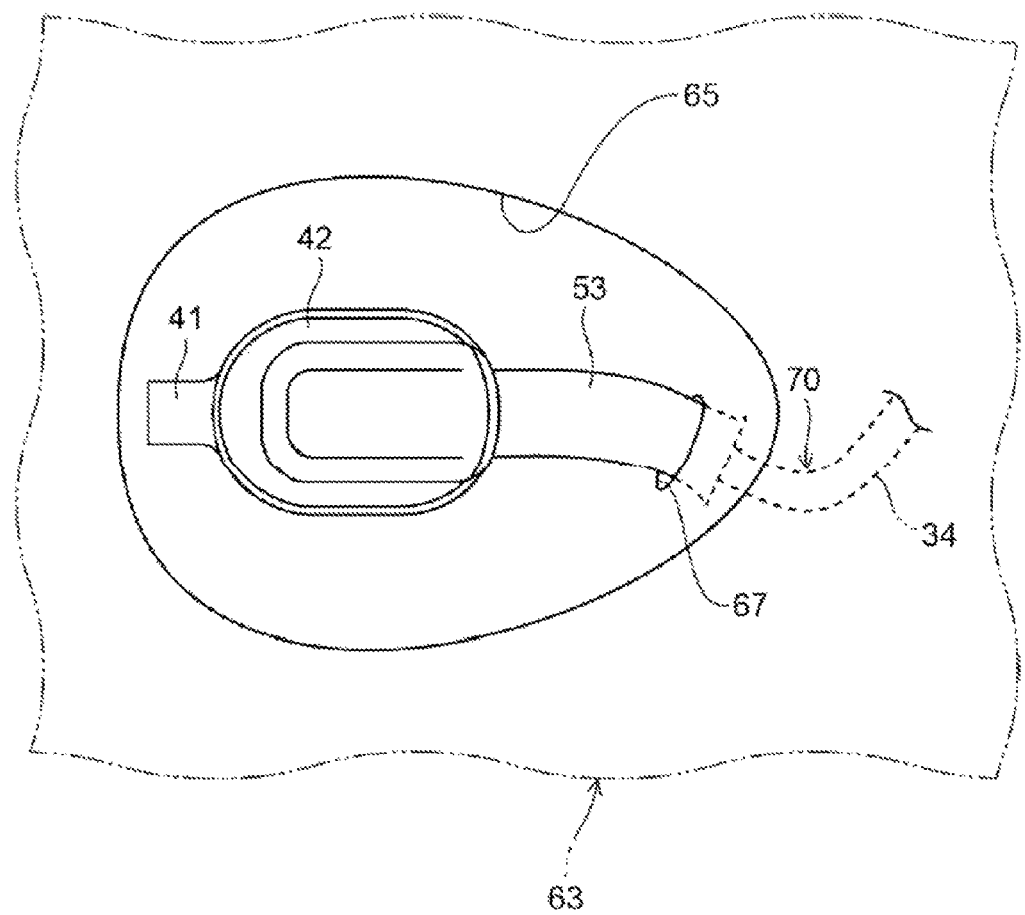
FIG. 14 is a diagram when viewed from arrow X in FIGS. 1 and 13.

FIG. 13 is a sectional diagram taken along line 13-13 of FIG. 1, and FIG. 14 is a diagram when viewed from arrow X in FIGS. 1 and 13. In FIG. 13, the side cowl 25R as a body cover of the motorcycle includes: an inner side cowl 63 located on a central side in the vehicle width direction; and an outer side cowl 64 located on an outer side in the vehicle width direction with respect to the inner side cowl 63. The inner side cowl 63 has a portion (recessed part) 65 extruded towards the outer side in the vehicle width direction, that is, recessed when viewed from a center in the vehicle width direction. Then formed at a bottom part in this recessed part 65 is a first opening part 66 through which the elastic support member 37 is fitted and inserted, and also formed at a body rear side wall 65C of the recessed part 65 is a second opening part 67 as a tube insertion hole that permits the tube 53 of the water avoiding part 42 to face the outside from the inside.

The elastic support member 37 is fitted into the first opening part 66, upon which an inner circumferential edge of the first opening part 66 is sandwiched from inside and outside by the flange portion 48 and the coupling portion 49 of the elastic support member 37 whereby the elastic support member 37 is fixed to the inner side cowl 63. The water avoiding part 42 is locked to the coupling portion 49 of the elastic support member 37, and the hinge part 41, as shown in FIG. 13, is bent through 180 degrees into a U shape. On an end surface of the coupling portion 49 of the elastic support member 37, that is, a surface facing the water avoiding part 42, the stay holding plate 55 is arranged, and through the bolt hole 60 of the stay holding plate 55, the bolt 58 provided at the base part 59 of the stay 44 is inserted from the outside and is screwed with a nut 68. At the flat plate part 57 of the stay 44, a locking screw 69 is screwed which is inserted from outer circumference of the stem part 33 of the blinker main body 27. The stay 44 is inserted in the stay through hole 45 of the elastic support member 37.

The electric wire 34 including the core 34C drawn out from the socket 30 supporting the bulb 31 passes through the electric wire through hole 43 of the elastic support member 37, and is extended towards the inner side cowl 63. The electric wire 34 passes through the water avoiding part 42, and is inserted through the electric wire insertion hole 52 provided in the tube 53 of the water avoiding part 42. The tube 53 through which the electric wire 34 is inserted penetrates through the second opening part 67 formed in the recessed part 65 of the inner side cowl 63 and is drawn towards the rear side of the body. The ground terminal 36 is fixed at the base 28 of the blinker main body 27 by the locking screw 39.

In FIG. 14, the second opening part 67 is formed on a lower side than a middle part in a vertical direction at a side wall of the recessed part 65 and is arranged obliquely slightly downward. Therefore, the tube 53 formed of an elastic body is sloped slightly downward and is directed to the second opening part 67. A portion of the electric wire 34 drawn through the tube 53 and exiting from the end part of the tube 53 extends further below the second opening part 67, forms a valley part 70 warped downward from the middle, and is extended to the top. Forming such a valley part 70 permits water covering and adhering to the electric wire 34, if any, to hardly enter into the tube 53. Moreover, the tube 53 engages with the second opening part 67 in an elastically bent state, which therefore improves force of the engagement of the tube 53 with the second opening part 67, whereby the tube 53 is reliably secured at the second opening part 67.

Next, one example of procedures of attaching the blinker main body 27 to the inner side cowl 63 will be described. The stay 44 is previously coupled to the stem part 33 of the blinker main body 27 with the locking screw 69. Then the elastic support member 37 is first fitted into the first opening part 66 of the inner side cowl 63. Consequently, the stay 44 attached to the blinker main body 27 is first inserted through the stay through hole 45. Simultaneously therewith, the electric wire 34 is inserted through the electric wire through hole 43. Upon the insertion of the stay 44 and the electric wire 34 into the elastic support member 37, the bolt 58 of the stay 44 penetrates through the bolt hole 60 (see FIG. 11) of the stay holding plate 55, and the electric wire 34 is inserted into the hole 61 of the stay holding plate 55. To the bolt 58 penetrating through the bolt hole 60 of the stay holding plate 55, the nut 68 is screwed. As a result of fastening the nut 68, an end surface of the stem part 33 of the blinker main body 27 abuts on the elastic support member 37 to be pressed thereagainst, and the stay holding plate 55 is pressed against an end surface of the coupling portion 49 of the elastic support member 37. Then the blinker main body 27 is elastically fixed at the recessed part 65 of the inner side cowl 63 as the blinker support part through the elastic support member 37.

After the blinker main body 27 is fixed at the inner side cowl 63 and inserting the electric wire 34 through the tube 53 of the water avoiding part 42, the water avoiding part 42 is bent in the hinge part 41 and is placed over the coupling part of the elastic support member 37. Consequently, the water avoiding part 42 covers the stay holding plate 55 arranged on the end surface of the coupling portion 49 of the elastic support member 37, and the stay through hole 45 and the electric wire through hole 43 of the elastic support member 37, that is, the electric wire outlet port 50 as the end part of the electric wire through hole 43 is also covered.

Moreover, the electric wire 34 inserted through the tube 53 of the water avoiding part 42 is drawn towards the outer side cowl 64 via the second opening part 67 formed at the inner side cowl 63. A tip of the tube 53 penetrating through the inner side cowl 63 via the second opening part 67 faces a space surrounded by the outer side cowl 64 and the inner side cowl 63, and the electric wire 34 is wired in this space and connected to a control part, now shown.

Next, action of the water avoiding part 42 will be described. Water covering the vehicle from the front or top during running or car wash intrudes from between the inner side cowl 63 and the front wheel WF, more specifically, between the inner side cowl 63 and the front fork 2 or the front fender 6, into a neighborhood of the recessed part 65 of the blinker main body 27 (arrow W). In the blinker support part of the blinker main body 27, the electric wire outlet port 50 in particular through which the electric wire 34 is inserted is covered by the water avoiding part 42, thus avoiding the intruding water from directly dropping at the electric wire outlet port 50.

According to the embodiment, the electric wire outlet port is covered by the water avoiding part, which can therefore make it difficult for getting water on the electric wire outlet port.

According to the embodiment, the water avoiding part can be firmly engaged with the electric wire to be supported.

According to the embodiment, the tip of the tube having the electric wire insertion hole is inserted into the body cover from the opening part, which therefore makes the water getting difficult. The tube of the water avoiding part can be inserted in the opening part of the body cover to thereby bring the tube having the electric wire insertion hole into engagement with the body cover. Moreover, there is no need of providing another hole for the electric wire insertion into the body cover.

According to the embodiment, the tube can be extended to the rear of the body to thereby avoid getting of the electric wire outlet port by water dropping from the front during car wash or water getting from the front during running.

According to the embodiment, the water getting can be even more avoided.

According to the embodiment, the water avoiding part is engaged to be supported in a manner such as to surround the electric wire outlet port, which therefore permits reliable water avoidance at the electric wire outlet port.

Obviously, numerous modifications and variations of the present invention are possible in light of the above teachings. It is therefore to be understood that within the scope of the appended claims, the invention may be practiced otherwise than as specifically described herein.

What is claimed is:

1. A saddle-ride vehicle blinker device comprising:
a blinker main body containing a bulb;
an elastic support member elastically supporting the blinker main body at a blinker support part provided on a vehicle body;
an electric wire outlet port from which an electric wire is drawn and which is disposed at or in a vicinity of the elastic support member, power being supplied to the bulb via the electric wire;

a water avoiding part to cover the electric wire outlet port;

a hinge part coupling the water avoiding part and the elastic support member both of which are molded integrally with the hinge part to form a one-piece structure; and the water avoiding part comprising an engagement part which is configured to engage with at least one of a part of the blinker main body, the electric wire, and the blinker support part to maintain the water avoiding part in a position to cover the electric wire outlet port while the hinge part is bent.

2. The saddle-ride vehicle blinker device according to claim 1, wherein the engagement part comprises an electric wire insertion hole provided in the water avoiding part, and by inserting the electric wire in the electric wire insertion hole, the water avoiding part is engaged with the electric wire to be supported.

3. A saddle-ride vehicle blinker device comprising:

a blinker main body containing a bulb;

an elastic support member elastically supporting the blinker main body at a blinker support part provided on a vehicle body;

an electric wire outlet port from which an electric wire is drawn and which is disposed at or in a vicinity of the elastic support member, power being supplied to the bulb via the electric wire;

a water avoiding part to cover the electric wire outlet port;

a hinge part coupling the water avoiding part and the elastic support member both of which are molded integrally with the hinge part; and the water avoiding part comprising an engagement part which is configured to engage with at least one of a part of the blinker main body, the electric wire, and the blinker support part to maintain the water avoiding part in a position to cover the electric wire outlet port while the hinge part is bent, wherein the engagement part comprises an electric wire insertion hole provided in the water avoiding part, and by inserting the electric wire in the electric wire insertion hole, the water avoiding part is engaged with the electric wire to be supported, wherein the blinker support part is a portion provided at a body cover of a saddle-ride vehicle, and the electric wire insertion hole is formed as a tube protruding from the water avoiding part, and at the body cover set with the blinker support part, an opening part through which the tube can be inserted towards inside of the body cover is provided, the engagement part is the tube, and a tip of the tube is inserted in the opening part whereby the water avoiding part engages with the body cover to be supported.

4. The saddle-ride vehicle blinker device according to claim 3, wherein, the body cover is a side cowl covering a region extending over top and sides of a front wheel, and the blinker main body is configured such that while the blinker main body is arranged on an outer side in a vehicle width direction with respect to the side cowl, the electric wire is arranged in a manner such as to penetrate through the side cowl from the outer side in the vehicle width direction towards the front wheel, and also the tube of the water avoiding part is extended to the rear of the body from the electric wire outlet port.

5. The saddle-ride vehicle blinker device according to claim 4, wherein the side cowl is formed by at least two members: an outer side cowl and an inner side cowl, the blinker main body is supported at the inner side cowl, the inner side cowl including the blinder support part recessed towards the outer side in the vehicle width direction, and the elastic support member and the opening part are arranged in the blinder support part.

6. The saddle-ride vehicle blinker device according to claim 1, wherein the elastic wire outlet is provided at the elastic support member, the water avoiding part includes a coupling portion surrounding the electric wire outlet port and having the electric wire outlet port, and the engagement part is a portion fitted to outside of the coupling portion to thereby engage with to be supported.

7. A saddle-ride vehicle blinker device comprising:

a blinker main body containing a bulb;

an elastic support member elastically supporting the blinker main body at a blinker support part provided on a vehicle body;

an electric wire outlet port from which an electric wire is drawn and which is disposed at or in a vicinity of the elastic support member, power being supplied to the bulb via the electric wire;

a water avoiding part to cover the electric wire outlet port;

a hinge part coupling the water avoiding part and the elastic support member both of which are molded integrally with the hinge part; and the water avoiding part comprising an engagement part which is configured to engage with at least one of a part of the blinker main body, the electric wire, and the blinker support part to maintain the water avoiding part in a position to cover the electric wire outlet port while the hinge part is bent, wherein the engagement part comprises an electric wire insertion hole provided in the water avoiding part to receive the electric wire, and wherein the electric wire insertion hole is formed as an elongated tube protruding from the water avoiding part.

\* \* \* \* \*